United States Patent Office 3,260,555
Patented July 12, 1966

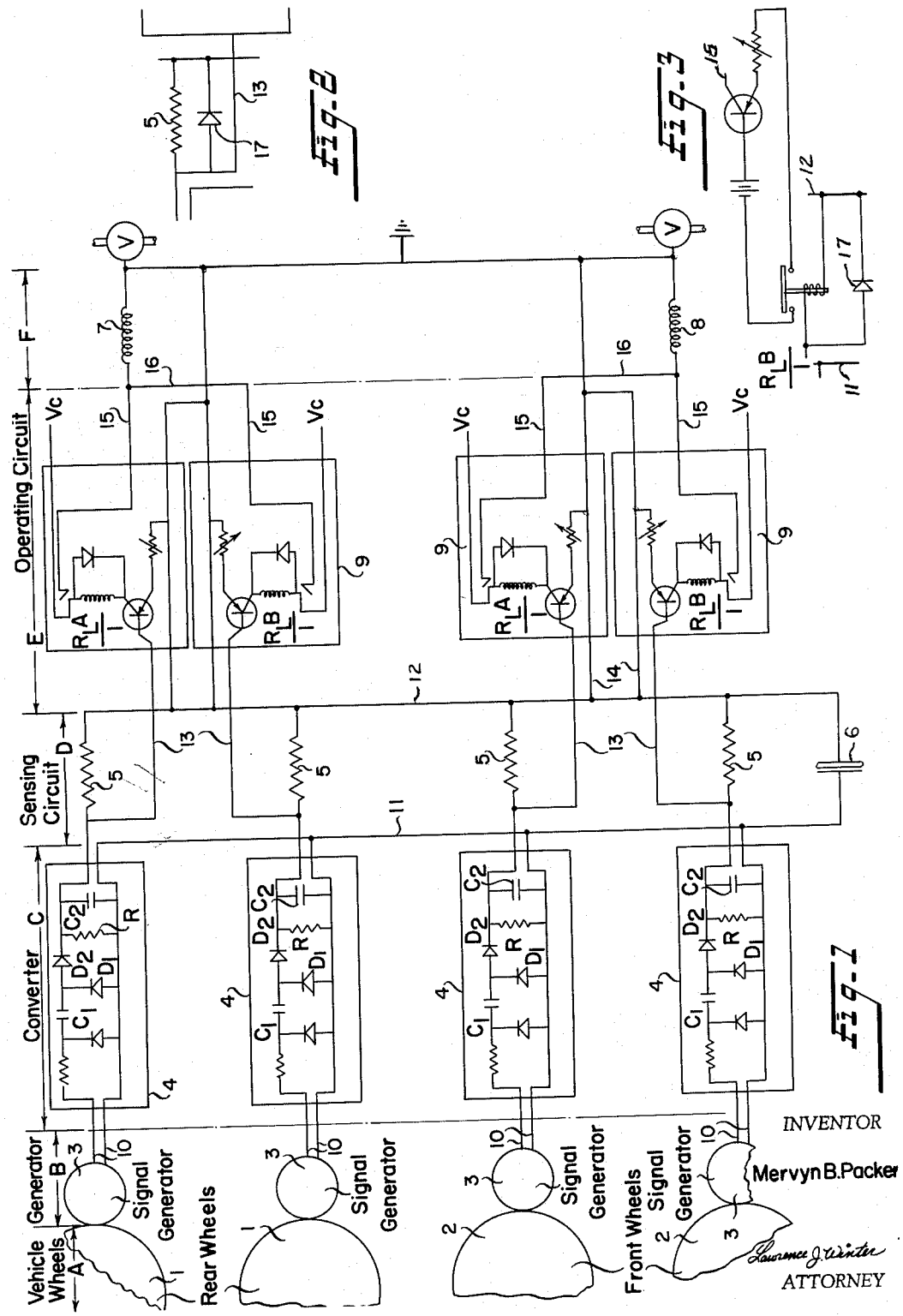

3,260,555
ANTI-SKID BRAKE SYSTEM
Mervyn B. Packer, Leamington Spa, England, assignor to Automotive Products Company Limited, Leamington Spa, England
Filed Apr. 26, 1963, Ser. No. 275,986
Claims priority, application Great Britain, Apr. 27, 1962, 16,202/62
10 Claims. (Cl. 303—21)

This invention relates to fluid pressure operated brakes for vehicles, and has for its object to provide means whereby the brake applying pressure acting on any one brake or number of brakes is reduced automatically to control the speed of a wheel, or number of wheels so that locking and skidding of the wheel or wheels can be prevented.

It is known that when vehicle brakes are applied with sufficient severity to cause lock, it is unusual for all the wheels to lock simultaneously. Therefore, if all the wheel speeds are compared with one another and the brakes released or relieved from any wheel or wheels revolving slower than the fastest wheel, a system of skid control can be obtained. If however the system is arranged to operate by comparing the speeds of all the braked wheels with one another as above-mentioned the control means will not operate if all the wheel speeds are the same and such that locking and skidding of all wheels can occur. To provide for this condition, it is desirable to provide additional means producing an arbitrary reference as to what the wheel speed should be in the event of all the wheels locking simultaneously. Thus the system of the invention can be arranged to operate either by comparing the speeds of all the braked wheels, by the use of means providing a reference as to what the wheel speeds should be or by a combination of such systems.

In accordance with the present invention it is proposed to provide a system having electrical means for sensing the individual wheels speeds and to utilise an electrical signal obtained as a result of any variation of the signal in relation to a predetermined characteristic to permit automatically the operation of means for controlling the braking force on any wheel or number of wheels revolving slower than a desired speed, such that the said braking force can be released. The electrical system comprises for example, a signal circuit including electrical signal producing means associated with each wheel of the vehicle. The outputs from the signal producing means being fed to a sensing circuit in which one of the outputs from all the signal producing means is made common. The other outputs thereof each being fed through a resistance, relay switch or other electrical device sensitive to changes in the signal circuit, to a common line, a capacitor being connected between said common connection and common line and an operating circuit including electrically operated valves each of which is operable by a signal from the sensing circuit to effect automatically the operation of the actuated valve to cause or permit the regulation of the braking force of the brake associated with said valve.

The means for controlling the braking force on any wheel may consist of a solenoid or other electrically operated valve, each said valve being arranged in the fluid circuit of a brake so as to be operable to regulate the supply of pressure fluid to the brake associated therewith. Alternatively, and as is preferred, control of the braking force is obtained by applying a force to the brake actuating means which acts in opposition to the braking force, or by increasing the volume of a part of the fluid pressure circuit of the brake whereby the braking force is reduced. It has already been proposed to provide braking systems of this kind, and such systems incorporate a fluid pressure operated servo-device the actuation of which is controlled by a mechanically operable sensing device. Such systems are disclosed in for example the specification of applications No. 935,830 and No. 944,007. To incorporate servo-operated means for controlling the braking force with the electrical system of the present invention, the actuation of each servo-operated device can be controlled by a solenoid or other electrically operated valve the operation of each of which is controlled by a signal from the sensing circuit of the system.

The signal producing means of the signal circuit produce a signal proportional to wheel speed and may be any suitable kind producing a signal resulting from for example a change of capacitance, inductance, resistance or voltage either A.C. or D.C.. If the signal from the signal producing means is other than a D.C. signal then such signal must be converted to a D.C. voltage for the detecting circuit. For example, if an A.C. generator is used as the signal producing means then it would be necessary to rectify and smooth the output for supply to the detecting circuit. This conversion would be unnecessary if a D.C. generator is used as the signal producing means.

As the intensity of the signals produced in the detecting circuit will be low it will be advantageous to amplify the signals for supply to the operating circuit. The amplified signals can be used to operate solenoid or other electrically operated valves used to control fluid pressure causing brake release or re-application. The method used for brake release may be by means of direct release of fluid pressure or by servo-control.

An embodiment of the invention as applied to a four wheeled vehicle, the wheels being arranged as two rear and two front wheels will now be described by way of example by aid of the accompanying schematic drawings, in which:

FIGURE 1 is a schematic circuit diagram of a preferred embodiment of the invention;

FIGURE 2 is schematic circuit diagram showing a modified form of a representative portion of the sensing circuit in which a unidirectional current means is connected in parallel with a resistance; and FIGURE 3 is a schematic circuit diagram of a modified form of a representative portion of the operating circuit.

In the accompanying schematic drawings, FIGURE 1 is divided into separate sections indicated respectively by the reference letters A, B, C, D, E and F, the section A indicates the road wheels of a four wheeled vehicle, reference numeral 1 being the rear wheels and 2 the front wheels. Each wheel is provided with a hydraulically operated brake (not shown), either drum or disc, the brakes being operable for normal braking by a conventional hydraulic system on the vehicle. Advantageously the brakes of the wheel pairs are coupled such that brake balance exists at all times but this is not essential and this feature will depend upon any one particular installation.

Signal producing means 3 associated with each wheel are shown in section B. The signal producing means 3 of the signal circuit of the system produce a signal proportional to wheel speed and can be of any suitable kind producing a signal resulting from for example a change of capacitance, inductance, resistance or voltage either A.C. or D.C. If the signal from the signal producing means is other than a D.C. signal then such signal must be converted to a D.C. voltage for the detecting circuit. For example, if an A.C. generator is used as the signal producing means then it would be necessary to rectify and smooth the output for supply to the detecting circuit. In the drawing the converter stage is indicated by letter C, and the individual converters by the reference numeral 4. This conversion would be unnecessary if a D.C. generator is used as the signal producing means.

Signals produced by the signal circuit are fed to a sensing circuit shown in section D. The sensing circuit includes four resistances 5, one for each wheel, and a condenser 6. The function of the sensing circuit is to produce a potential which provides a signal which is fed to an operating circuit which includes electrically operated valves each of which is operable by the signal from the detecting circuit to effect automatically the operation of the actuated valve. The operating circuit is indicated in sections E and F, as shown in FIGURES 1, 2 and 3. Section F includes two solenoid operated valves 7 and 8 respectively. The valve 7 controls the braking force of the brakes of the rear wheels 1 and valve 8 controls the braking force of the brakes of the front wheels 2. As the intensity of the signals generated by the detecting circuit will be low, amplifiers and/or switch circuits are included in the operating circuit. These are included in section E of the operating circuit and indicated generally by the reference numeral 9.

In the following more detailed description of the system shown in the accompanying schematic drawing it will be assumed that each signal producing means 3 is provided by an A.C. generator. Each A.C. generator is coupled to the associated wheel so as to be driven thereby, the output from each such generator being connected by the conductors 10 to the input of the appropriate converter 4 each of which is operable to convert the output from the associated generator to a D.C. voltage proportional to road speed of the vehicle.

On the output side of each converter the negative (or positive) outputs of the D.C. signals are connected to a common conductor 11. The positive (or negative) outputs are each fed through the appropirate resistance 5 to a common line hereinafter referred to as a reference line 12. The capacitor 6 is connected between the reference line 12 and the common conductor 11 joining the outputs of the D.C. signals. The signals from the sensing circuit are fed to the input side of the amplifiers by conductors 13 and 14, the output side of each amplifier being connected by conductors 15, 16 to the circuits of the valves. The system operates as follows:

When the vehicle travels at constant speed the outputs of the A.C. generators 3 will be identical. The capacitor 6 will charge up to the potential of the D.C. signals through the resistances 5 until the potential of the reference line 12 equals that of the generated signal.

When the vehicle decelerates during brake applications without skid, the generated D.C. signals will decrease slowly and cause the capacitor 6 to discharge through the resistances 5. The current through the resistances will be small because of the slow change of speed.

In the event of a wheel skidding, the D.C. signal of the wheel concerned will fall rapidly, but because of the capacitor and the remaining signals, the reference line voltage will remain substantially proportional to the vehicle speed, therefore a relatively large potential will exist across the resistance 5 associated with the skidding wheel. This potential then provides a signal which is fed through the appropriate amplifier 9 to operate a switch or switch circuit controlling actuation of the appropriate valve 7. This can be improved by placing a rectifier 17 (see FIGURE 2) across each resistance 5 such that the capacitor 6 is charged through the rectifiers but can only discharge through the resistances. A diode can be used instead of the rectifier 17.

In the extreme case of all wheels locking simultaneously the discharge of the capacitor 6 through the resistances 5 will provide the necessary signal and maintain the reference line 12 at an arbitrary potential approximating to vehicle speed. When all wheels of the vehicle are locked, obviously, there are no current flows or signals from generators 3 to charge condenser 6. Charged condenser 6 cannot discharge through unidirectional current rectifiers 4 and diode rectifier 17. Therefore condenser 6 will only discharge its charge through resistances 5 and amplifiers 9 which critical output current or signal is sufficient to operate solenoid windings 7 and 8 and release the brake means on the respective vehicle wheels, as understood by those skilled in the art.

The resistances 5 can form the load resistance of the amplifier to insure that the signal supplied by amplifiers 9 is of proper critical current and voltage value to insure a proper output signal to operate solenoid valve windings 7 and 8. The resistances 5 will therefore become part of the amplifier. One possible arrangement is to replace the resistances with high resistance relays such that at the critical current value of the signal they are energised and hence close a switch to give effective amplification of the signal through amplifier 9 to operate windings 7 and 8.

In the arrangement described any one signal from a pair of wheels is used to release the braking force on each wheel, hence one solenoid valve 7 serves two wheels. Similarly it should be possible to use one amplifier to control a pair of wheels instead of two as shown.

In the system as described the reference line 12 takes an excessive time to reach the potential of the generators due to the slow rate of charging of the capacitor 6.

Instead of comprising all the wheel speeds with one another, the same can be compared with an arbitrary reference means providing a reference as to what the wheel speeds should be. For example such arbitrary reference means can consist of a device including an unbraked reference wheel running at a predetermined speed. Alternatively the above described system can be used in conjunction with the arbitrary reference means.

I claim:

1. A fluid pressure operated braking system for vehicles wherein an electrical system is provided including electrical means for sensing the individual wheel speeds, an electrical signal obtained as a result of any variation of the signal in relation to a predetermined characteristic being utilized to permit automatically the operation of valve means for controlling the braking force on any wheel or number of wheels revolving slower than a desired speed such that the braking force can be released wherein the electrical system comprises a signal circuit including electrical signal producing means associated with each wheel of the vehicle the outputs from the signal producing means being fed to a sensing circuit in which one of the outputs from all the signal producing means is fed to a first common line, the other outputs thereof each being fed through a resistance sensitive to changes in the signal circuit for developing a signal output to a second common line, a capacitor being connected between said first and second common lines, said valve means having an operating circuit responsive to said signal output including electrically operated valves each of which is operatble by a signal from the sensing circuit to effect automatically the operation of the actuated valve to permit the regulation of the braking force of the brake associated with said valve.

2. A braking system according to claim 1, wherein a unidirection current device is connected across each resistance in the sensing circuit.

3. A braking system according to claim 1, wherein each said electrically operated valve is arranged in the fluid circuit of a brake means so as to be operable to regulate the supply of pressure fluid thereto.

4. In combination with a vehicle having a plurality of wheels, a fluid pressure operated braking system including separate brakes for the respective wheels, and means for applying said brakes, an electrical system comprising a signal circuit including electrical signal producing means associated with each wheel of the vehicle, the outputs from the signal producing means being fed to a sensing circuit in which one of the outputs from all the signal producing means is made as a common connection, the other outputs thereof each being fed through a resistance to a common line for developing a signal; a capacitor being connected between said common connection and said common line; and an operating circuit including electrically operated valves, each of which is operable by a signal from the sensing circuit to effect automatically the operation of the actuated valve to release the braking force associated with said valve.

5. A braking system according to claim 4, wherein a unidirectional current device is connected across each resistance in the sensing circuit.

6. A braking system according to claim 4, wherein each said electrically operated valve is arranged in the fluid circuit of a brake system so as to be operable to regulate the supply of pressure fluid to the means for applying the brakes thereof.

7. A braking system according to claim 4, wherein each said electrically operated valve is arranged to release actuation of means for applying a force to brake actuating means of a brake which force acts in opposition to the braking force acting on the brake.

8. A braking system according to claim 4, wherein each said electrically operated valve is arranged to release actuation of means operable to increase the volume of a part of the fluid pressure circuit of a brake whereby the braking force is reduced.

9. A braking system according to claim 8, wherein the signal producing means comprises A.C. generator means including a plurality of generators, each of said generators being adapted for coupling to an associated wheel so as to be driven thereby, a converter being connected to the output of each generator for converting the generator output to direct current voltage.

10. A braking system according to claim 9, wherein signals from the detecting circuit are fed through an amplifier in the operating circuit.

References Cited by the Examiner
UNITED STATES PATENTS

| | | | |
|---|---|---|---|
| 2,283,608 | 5/1942 | McCune | 303—21 |
| 2,389,050 | 11/1945 | Hines | 303—21 |
| 2,788,186 | 4/1957 | Wilson. | |
| 2,980,369 | 4/1961 | Ruof. | |

EUGENE G. BOTZ, *Primary Examiner.*